United States Patent [19]
Lorang

[11] 3,796,253
[45] Mar. 12, 1974

[54] DEVICE FOR CENTERING A CENTRIFUGAL CASTING MOULD FOR TUBULAR BODIES
[75] Inventor: Pierre Edourd Lorang, Nancy, France
[73] Assignee: Societe Des Fonderies De Pont-A-Mousson, Nancy, France
[22] Filed: Sept. 2, 1971
[21] Appl. No.: 177,558

[30] Foreign Application Priority Data
Sept. 9, 1970 France .............................. 70.32687

[52] U.S. Cl. ............................. 164/291, 164/298
[51] Int. Cl. ........................................... B22d 13/02
[58] Field of Search ..................... 164/291, 298–301

[56] References Cited
UNITED STATES PATENTS
1,500,428   7/1924   Weitling ........................ 164/300 X
2,836,864   6/1958   Biganzoli ........................... 164/291
3,651,859   3/1972   Wahl et al. ......................... 164/291
1,347,582   7/1920   Ladd .................................. 164/291

FOREIGN PATENTS OR APPLICATIONS
481,334   8/1929   Germany ............................ 164/298

Primary Examiner—Robert D. Baldwin
Attorney, Agent, or Firm—Sughrue, Rothwell, Mion, Zinn & Macpeak

[57] ABSTRACT

Device for centering a rotary mould in a case of a centrifugal casting machine. The device comprises rolling bearings interposed between the case and the mould at the mould ends and at at least one point intermediate the mould ends.

4 Claims, 4 Drawing Figures

PATENTED MAR 12 1974  3,796,253
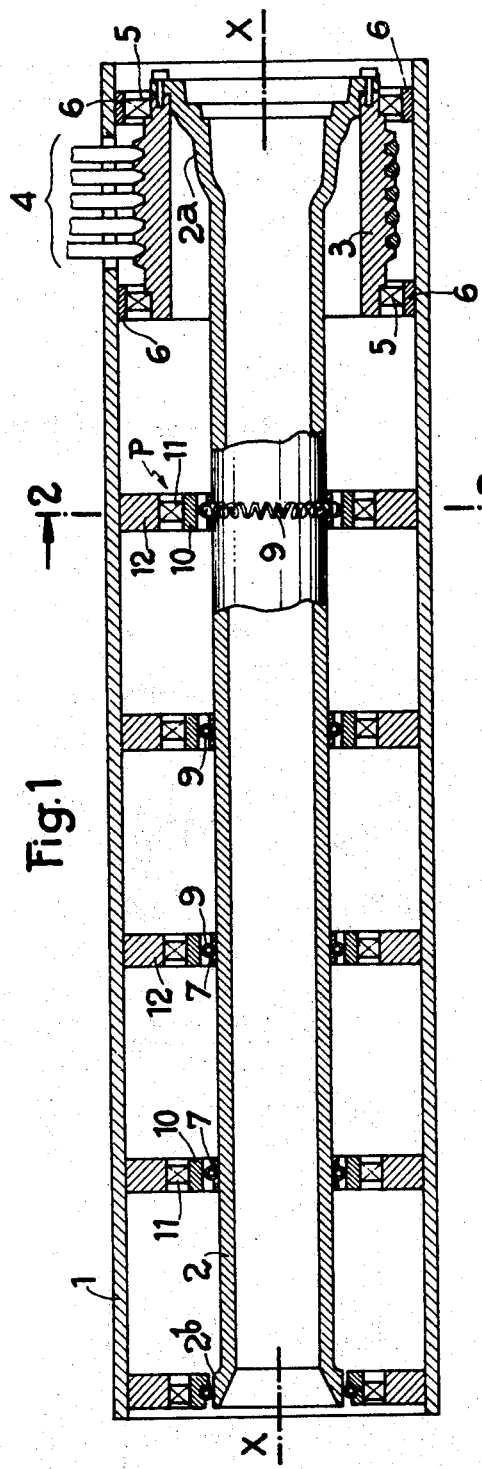
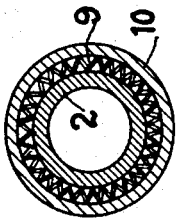
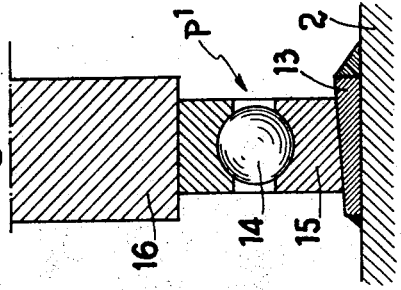
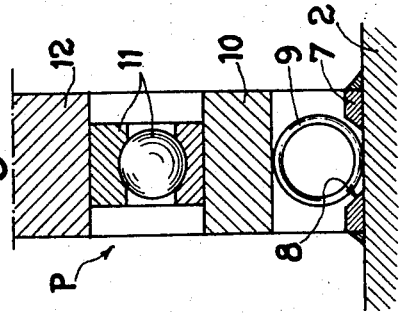
INVENTOR
PIERRE EDOUARD LORANG
BY Sughrue, Rothwell, Mion, Zinn & Macpeak
ATTORNEYS

DEVICE FOR CENTERING A CENTRIFUGAL CASTING MOULD FOR TUBULAR BODIES

The present invention relates to the centering of rotary moulds or shells in machines for centrifugally casting metal bodies and more particularly relates to the centering of moulds having no cooling water jacket.

The mounting of a rotary tubular mould in a centrifugal casting machine is difficult owing to the fact that the mould is very long (several meters) with respect to its diameter (on average of the order of several hundreds of millimeters). This mounting is further complicated when it concerns a mould for casting iron owing to axial and radial expansions.

A known device for supporting a centrifugal casting mould consists of a number of rolling rollers arranged at several points along the length of the mould. When the mould is rotated, the latter is raised by the driving belts and this conventional device therefore results in a defective centering and does not prevent the mould from jumping and vibrating.

Another known way of supporting the mould comprises interposing between the mould and a sleeve, which is mounted on rollers, resiliently yieldable rings constituted by coil springs which extend around the sleeve and have their ends interconnected. This device is perfect for supporting the variations in the dimensions of the mould due to thermal expansions and for centering the mould relative to the sleeve, but the latter must itself be centered and this creates the aforementioned problem.

Another known manner of supporting a rotary mould comprises centering the mould at its ends on rings which are themselves centered on ball bearings outside the case containing the cooling water jacket for the mould. These bearings carry the case ends of reduced diameter and are connected to rings carrying the ends of the mould. This device only achieves a precise centering if the surfaces of the supports of the ball bearings on the bearing systems (surfaces pertaining to said bearing systems and to said rings and interposed between the mould and the case) are themselves machined with the same precision as the ball bearings. Now, as this is usually not the case the centering precision is illusory notwithstanding the use of ball bearings.

An object of the invention is to provide a centering device for a rotary mould in a machine for centrifugally casting tubular bodies without a water jacket which overcomes the aforementioned drawbacks.

The invention provides a centering device wherein the ball bearings are interposed between the rotary mould and the non-rotating case at the ends of the mould and at least at one point intermediate the ends.

With this arrangement the centering is excellent.

According to another feature of the invention, resiliently yieldable rings constituted in the known manner by coil springs closed onto themselves are interposed at spaced apart points along the entire length of the mould between the mould and the rings of the rolling bearings.

With this arrangement, the advantages of the centering can be maintained upon thermal expansion of the mould.

Further features and advantages of the invention will be apparent from the ensuing description with reference to the accompanying drawing.

In the drawing:

FIG. 1 is a longitudinal diagrammatic sectional view of a device according to the invention;

FIG. 2 is a partial sectional view taken along line 2—2 of FIG. 1 showing a coil spring arranged in the form of a ring;

FIG. 3 is a detail longitudinal sectional view, on an enlarged scale, of the centering means according to the invention, and FIG. 4 is a detail longitudinal sectional view, on the same scale as FIG. 3, of a modification of the centering device according to the invention.

In the embodiment shown in FIGS. 1–3, the centering device according to the invention is employed in a centrifugal casting machine having a fixed cylindrical case 1. The case 1 has an axis X—X coinciding with the axis of rotation of the mould or shell 2 for casting the pipe. The mould 2 has a divergent end portion $2^a$ corresponding to the socket of the pipe. The opposite end of the pipe is slightly enlarged at $2^b$.

Note that spraying jets for cooling the mould 2 are mounted in the annular space or chambers between the mould 2 and the case 1, but for reasons of clarity these jets have not been shown.

The end $2^a$ of the mould is fixed to and centered in a sleeve 3 for driving the mould in rotation. The sleeve 3 has a number of grooves, for example having a V-shaped cross section for receiving mould-driving V-belts 4 which also extend around a pulley (not shown) driven by a motor and carried on the outside of the case 1.

According to the invention, rolling bearings 5 having balls or rollers are directly interposed between the sleeve 3 and peripheral rings 6 which are fixed to the case 1.

Further, a number of rolling bearings P having rollers are interposed between the case 1 and the mould 2 at spaced-apart points along the entire length of the mould for example in the following manner.

Support collars 7 are arranged at suitable intervals along the entire length of the mould 2 and welded or fixed in position by any other means, for example by a resiliently yieldable ring engaged in an outer groove in the mould (FIGS. 1 and 3).

Each of these collars or pairs of these collars define a trapezoidal groove 8 for disposing a resiliently yieldable ring 9 constituted by a coil spring extending around the mould (FIG. 2) and having its two ends interconnected by welding or clips.

The enlarged end portion $2^b$ of the mould replaces the support collars 7 at this point. The rings 9 are disposed within inner support rings 10 for the bearing system P.

The bearing systems P comprise ball or roller bearings 11 interposed between the inner rings 10 and outer rings 12 integral with the case 1. The rings 12 are fixed to the case 1 for example by welding.

The device according to the invention operates in the following manner:

When the mould rotates, the rolling bearings 5 perfectly center the socket end $2^a$ of the mould through the medium of the sleeve 3. The rest of the length of the mould is centered by the combination of the resiliently yieldable rings 9 and the rolling bearings 11. This centering is maintained irrespective of axial or radial thermal expansions of the mould 2 since the expansions are accomodated by the spring rings 9.

Note that the interposition of the spring rings 9 between the bearing system P and the mould 2 facilitates the mounting of the mould inside the bearing system P having rolling bearings 11 whose perfect alignment is difficult to achieve in mechanical constructions.

With this assembly it has been observed that the rotation of the mould 2 is rendered much more steady since the mould does not jump (elimination of vibrations).

In the modification shown in FIG. 4, the resiliently yieldable spring rings 9 which were located in the first embodiment between the ends $2^a$ and $2^b$ of the mould 2 are dispensed with and replaced by a single centre rolling bearing system $P^1$. The latter comprises a support ring 13 integral with the mould 2 to which it is welded and defining a tapered outer face, a rolling bearing 14, for example a ball bearing, having an inner bearing ring 15 defining an axial aperture having a taper matching the taper of the outer face of the ring 13, and a peripheral outer ring 16 which is fixed to the case for example by welding and constitutes means combining the outer bearing ring of rolling bearing 14 with the case 1. The taper of the outer face of the ring 13 depends on the axial and radial expansion of the mould and is chosen accordingly. Ring 13 constitutes means combining the inner bearing ring 15 with the mould 2.

In this modification, the mould 2 is therefore supported only in three regions, namely: at its two ends $2^a$ and $2^b$, with the use of a spring ring 9 at $2^b$, and in its middle part by the direct centering on the bearing system $P^1$. Thus there is no vibration when the mould rotates notwithstanding the lack of resiliently yieldable means interposed between the bearing system $P^1$ and the mould.

Having now described my invention what I claim as new and desire to secure by Letters Patent is:

1. In a centrifugal casting machine comprising a fixed case, a rotary mould devoid of a water jacket disposed within and coaxially of the case, and means for mounting the mould in the case at a first end of the case in such manner as to allow the mould to be withdrawn from the case from said first end; the provision of a device for centering the mould in the case and comprising a first rolling bearing system having an outer ring combined with said case and an inner ring combined with said means for mounting the mould, a plurality of second rolling bearing systems interposed between the case and the mould and including an end second rolling bearing system adjacent a second end of the case which is opposite said first end of the case, the first rolling bearing and second rolling bearing systems being in axially spaced relation to each other and defining with the case and the mould annular chambers and the second rolling bearing systems having an outer ring combined with the case and an inner ring surrounding the mould, a coil spring in the form of a ring being interposed between and engaging the mould and the inner ring of each of said second rolling bearing systems.

2. In a centrifugal casting machine comprising a fixed case, a rotary mould devoid of a water jacket disposed within and coaxially of the case, and means for mounting the mould in the case at a first end of the mould in such manner as to allow the mould to be withdrawn from the case from said first end; the provision of a device for centering the mould in the case and comprising a first rolling bearing system having an outer ring combined with said case and an inner ring combined with said means for mounting the mould, a second rolling bearing system having an outer ring combined with the case and an inner ring surrounding an end portion of the mould adjacent a second end of the mould opposite said first end of the mould, a coil spring in the form of a ring interposed between and engaging the mould and the inner ring of said second rolling bearing system and an intermediate rolling bearing system interposed between said first rolling bearing system and second rolling bearing system, the first rolling bearing system, the second rolling bearing system and the intermediate rolling bearing system defining with the case and the mould two annular chambers.

3. The casting machine of claim 2, wherein the intermediate rolling bearing system comprises an outer ring integral with the case and an inner ring surrounding the mould and means are interposed between and engage the inner ring of the intermediate bearing system and the mould for accomodating axial and radial expansion of the mould.

4. The machine of claim 2, wherein the intermediate rolling bearing system comprises an outer bearing ring, means combining the outer bearing ring with the case and an inner bearing ring, means associated with the inner bearing ring and defining a tapered axial aperture, a support ring integral with the mould and defining an outer face having a taper matching the taper of said tapered axial aperture being engaged in said tapered axial aperture and free to move axially of said inner tapered axial aperture.

* * * * *